Sept. 21, 1965   L. J. PARKINSON   3,207,966

MOTOR CONTROL CIRCUIT

Filed Sept. 12, 1961

*INVENTOR.*
LELAND J. PARKINSON

BY J. T. Comfort

ATTORNEY

United States Patent Office 3,207,966
Patented Sept. 21, 1965

3,207,966
MOTOR CONTROL CIRCUIT
Leland J. Parkinson, Roanoke, Va., assignor to General Electric Company, a corporation of New York
Filed Sept. 12, 1961, Ser. No. 137,637
1 Claim. (Cl. 318—139)

This invention relates to a multiple voltage input source with the specific embodiment described directed to a motor control circuit for a D.-C. motor.

Heretofore multiple voltage input sources and particularly motor control circuits for the most part have used series resistors to control the voltage applied to a D.-C. motor. Such a motor control circuit is wasteful of energy and it is therefore an object of this invention to provide an efficient motor control circuit for a D.-C. motor.

Other motor control circuits have selectively connected the cells of a battery in series to provide the increased voltage. However, in such a circuit the cells of the battery are not used equally and some cells discharge before others.

Another object of this invention is to provide a new and improved motor control circuit which uses all cells of a battery equally.

In accordance with the principles of this invention a multiple voltage input source for a load such as a D.-C. motor has two or more batteries. First switching means connect the batteries in parallel with the load to apply a first voltage to the load. Second switching means connect the batteries in series with the load to apply a second voltage to the load. A unidirectional device such as a rectifier or diode is connected between each battery and the load to permit current flow only in a forward direction.

Thus a multiple voltage input source such as a motor control circuit for a D.-C. motor is provided which is efficient and uses all cells of a battery equally. The diodes prevent back currents.

The novel features of the invention are set forth with particularity in the appended claim. The invention is-self, however, both as to its organization and method of operation, together with further objects and advantages thereof, may best be understood by referring to the following description and the accompanying drawings.

Figure 1:
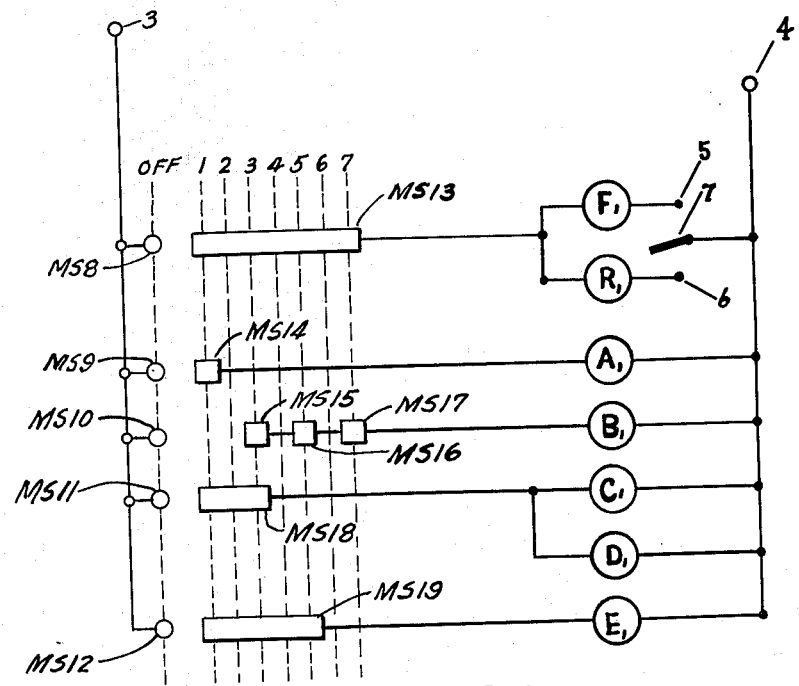
FIG. 1 is a schematic of the control circuitry for the motor control circuit.

Referring now to FIGURE 1 for a description of the motor control circuit, a D.-C. voltage is applied to terminals 3 and 4. The masterswitch is provided with contact fingers MS8–MS12 adapted to make sliding connection with contact segments MS13–MS19. The masterswitch contact fingers MS8–MS12 are all connected together and to the power supply applied to terminal 3, thus allowing current to flow through coils $F_1$, $R_1$, $A_1$, $B_1$, $C_1$, $D_1$, $E_1$, in the necessary combinations shown in Table 1.

Figure 2:
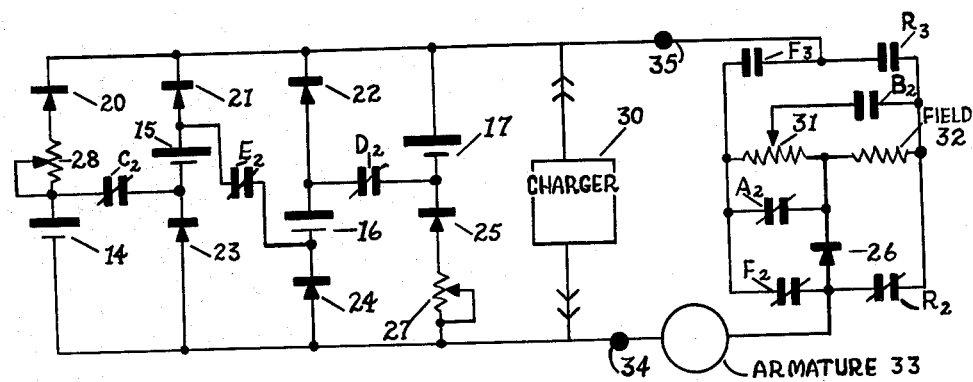
FIG. 2 is a schematic of the power circuitry for the motor control circuit.

In FIG. 2 contacts $A_2$, $C_2$, $D_2$, $E_2$, $F_2$, and $R_2$ are normally closed. Contacts $B_2$, $F_3$ and $R_3$ are normally open. Batteries 14–17 are four different cells of a six volt battery. Unidirectional devices 20–26 are standard unidirectional devices permitting current flow in a forward direction, and may be either diodes or rectifiers.

Balancing resistors 27 and 28 are standard balancing resistors to balance the current in the parallel circuits. A charger 30 may be connected to charge the cells of the battery. Center tapped resistor 31 is a standard center tapped resistor. Field 32 and armature 33 are the field and armature, respectively, of a standard series connected D.-C. motor.

TABLE 1

*Condition of the master switches*

[X indicates contacts closed]

| Position of control switch | Off | 1 | 2 | 3 | 4 | 5 | 6 | 7 |
|---|---|---|---|---|---|---|---|---|
| Master switches: | | | | | | | | |
| MS8 | | X | X | X | X | X | X | X |
| MS9 | | X | | | | | | |
| MS10 | | | | X | | X | | X |
| MS11 | | X | X | X | | | | |
| MS12 | | X | X | X | X | X | | |

The motor control circuit provides seven different speeds for the motor depending on the position of the master switch as shown in Table 1.

Table 1 shows which master switch contact must be engaged to apply the sevent different speeds to the motor.

Reference should now be made to FIGS. 1 and 2 with Table 1 for a description of the operation of the motor control circuit.

Switch 7 is switched to terminal 5 for forward operation and terminal 6 for reverse operation. Assume switch 7 is switched to terminal 5 for forward operation.

For the first speed position as shown in Table 1 master switch contacts 8, 9, 11 and 12 are closed and coils $F_1$, $A_1$, $C_1$, $D_1$, and $F_1$ are energized. Therefore, contacts $F_2$, $A_2$, $C_2$, $D_2$, and $E_2$ are opened and contact $F_3$ is closed.

Therefore batteries 14–17 are connected in a parallel circuit through closed contact $F_3$, resistor 31, field 32, closed contact $R_2$, and armature 33 to apply a first voltage to the field 32 of the motor. The motor thus operates at a first speed.

For the second speed position, master switch contacts 8, 11 and 12 remain closed and 9 is opened. Contact $A_2$ is therefore closed and resistor 31 is shorted out so that the full voltage from the batteries in parallel is applied to the field 32 as a second voltage greater in amplitude than the first voltage and the motor operates at a second speed.

For the third speed position, master switch contacts 8, 11 and 12 remain closed and master switch contact 11 is closed to energize coil $B_1$ and close contact $B_2$. This provides a weak field position with part of the current shunted around the field 32 so that the motor operates at a third speed.

In the fourth speed position, master switch contacts 8 and 12 remain closed and master switch contacts 10 and 11 are opened to de-energize coils $B_1$, $C_1$, and $D_1$. Thus contacts $C_2$, and $D_2$ are closed and contact $B_2$ is opened. Batteries 14 and 15 are connected in series with each other and batteries 16 and 17 in series with each other. The two pairs are connected in parallel to the field 32 to apply a voltage to the field 32 so that the motor operates at a fourth speed.

The fifth speed position causes master switch contacts 8 and 12 to remain closed and also closes master switch contact 10 to energize coil $B_1$ and close contact $B_2$ for a weak field position so that the motor operates at a fifth speed.

The sixth speed position causes master switch contact 8 to remain closed and opens master switch contacts 10 and 12 to deenergize coils $B_1$ and $E_1$. Contact $B_2$ is opened and $E_2$ is closed. All batteries 14–17 are now connected in series to the field 32 so that a higher voltage is applied to the field 32 of the motor and the motor operates at a sixth speed.

The seventh speed position causes master switch contact 8 to remain closed and also closes master switch contact 10 to energize coil $B_1$ and close contact $B_2$ so that a weak field position exists, and the motor operates at a seventh speed.

Thus it can be seen that as greater voltages are applied to the field 32 of the motor the speed of the motor is increased. The weak field contact $B_2$ provides for further speed variations. The direction of the motor may be reversed by switching the switch 7 to terminal 6 so that the current flows through the field 32 in a different direction through contact $R_2$ and $F_2$. Diodes 20–25 permit current flow only in a forward direction and prevent back currents.

The specific embodiment shown uses a series connected D.-C. motor, however, if the weak field contact $B_2$ was eliminated any load could be connected in the circuit to points 35 and 34. Another D.-C. motor could be connected in the circuit and controlled, or any other load requiring a multiple voltage input.

A typical circuit has been described using four batteries, other circuits using six or more batteries could be connected in a similar manner to the embodiment shown and described.

A multiple voltage input source in the form of a motor control circuit has been described that is efficient and uses all batteries equally at all times.

While this invention has been explained and described with the aid of a particular embodiment thereof, it will be understood that the invention is not limited thereby and that many modifications will occur to those skilled in the art. It is therefore contemplated by the appended claim to cover all such modifications as fall within the scope and spirit of the invention.

What is claimed is:

A motor control circuit for a series connected D.-C. motor having an armature and field connected in series comprising a first battery, a second battery, a third battery, a fourth battery, first switching means for connecting said batteries in parallel with the armature and field to apply a first voltage to said field, second switching means for connecting said first and second batteries in series, said third and fourth batteries in series and the series connection of said first and second batteries and the series connection of said third and fourth batteries in parallel with the armature and field to apply a second voltage to said field, third switching means for connecting said batteries in series with said armature and said field to apply a third voltage to said field, fourth switching means for connecting said batteries in series with said armature and field and for shunting a portion of the current around said field to apply a fourth voltage to said field, a unidirectional device connected between each battery and the field to permit current flow only in a forward direction and switching means for reversing the direction of current flow through said field to reverse the direction of rotation of the motor.

References Cited by the Examiner

UNITED STATES PATENTS

| 1,110,821 | 9/14 | Radley | 318—139 |
| 1,776,317 | 3/26 | Huguenin | 318—139 |
| 3,134,063 | 5/64 | Hastings | 318—139 |

FOREIGN PATENTS

| 150,555 | 3/53 | Australia. |
| 1,197,508 | 12/59 | France. |

ORIS L. RADER, *Primary Examiner.*